July 1, 1930.  J. F. ENGLE  1,769,124
SEALING MEANS FOR TIRE VALVE NIPPLES
Filed June 4, 1928
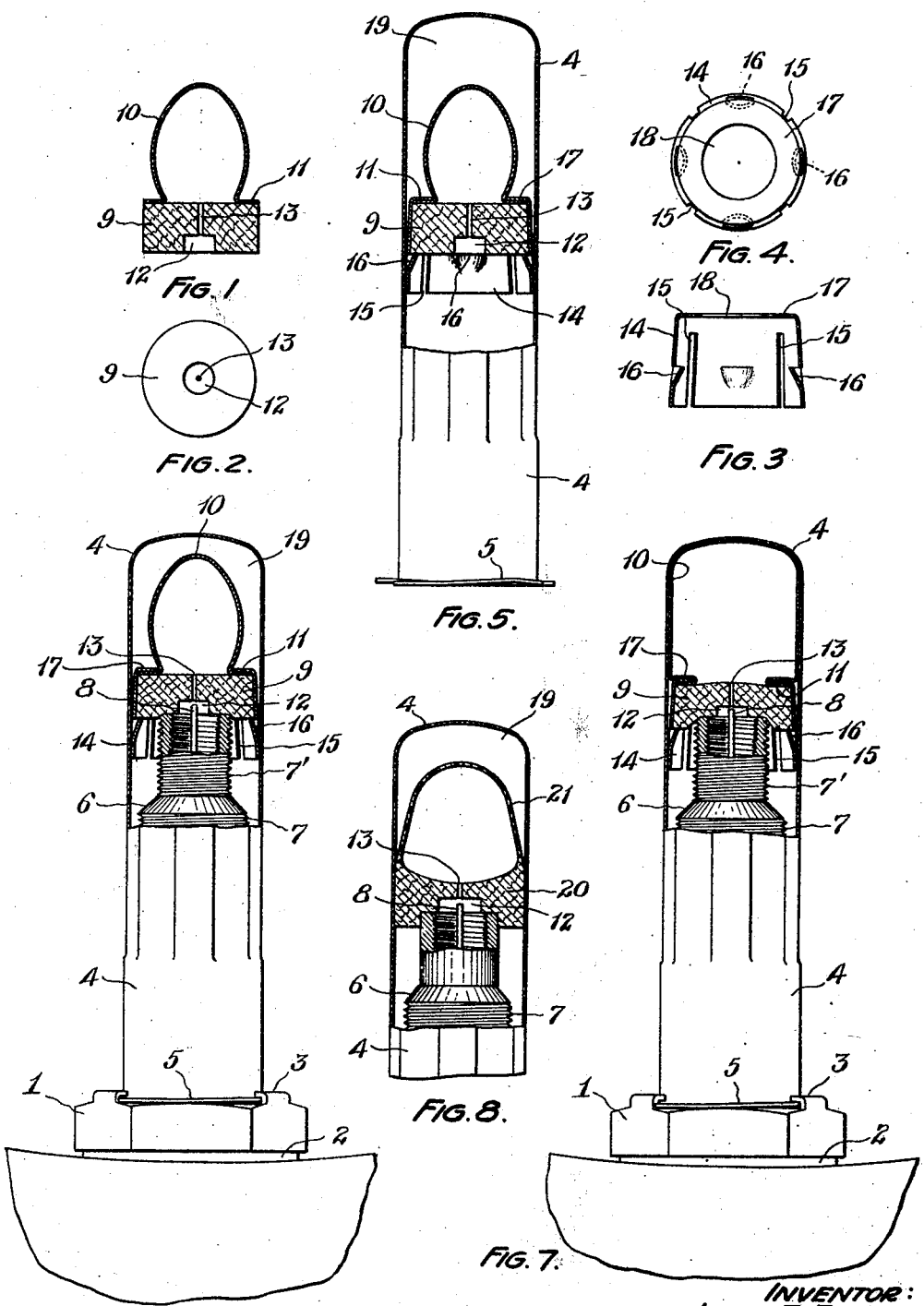

Patented July 1, 1930

1,769,124

UNITED STATES PATENT OFFICE

JOHN F. ENGLE, OF LAKEWOOD, OHIO

SEALING MEANS FOR TIRE-VALVE NIPPLES

Application filed June 4, 1928. Serial No. 282,515.

My invention relates to sealing means for tire-valve nipples. Particularly, the invention relates to resilient and air-inflatable means of this character adapted to be contained within a dust-cap member and therein seated upon the mouth of the nipple through which extends the stem of the usual tire-valve.

The annexed drawing and the following description set forth in detail certain means exemplifying my invention, such disclosed means constituting, however, but two of the various forms in which the principle of my invention may be embodied.

In said annexed drawing:

Figure 1 is a vertical section of a sealing element forming part of my improved sealing means for tire-valve nipples;

Figure 2 is a bottom plan view of the element shown in Figure 1;

Figure 3 is a vertical section of a spring metal casing member forming an element of my improved sealing means;

Figure 4 is a plan view of the element shown in Figure 3;

Figure 5 is a partial elevation and partial vertical section of the elements shown in Figures 1 and 3 assembled within a dust-cap;

Figure 6 is a view similar to Figure 5 in which the dust-cap and its contained sealing means have been assembled upon a nipple mounted in the felloe of a vehicle wheel, this view illustrating the condition when there is no leak in the tire-valve;

Figure 7 is a view similar to Figure 6 and illustrating the condition when there is a leak in the tire-valve; and Figure 8 is a fragmentary view similar to Figure 5 showing a modified form of sealing means.

Referring to the annexed drawing in which the same parts are indicated by the same respective ordinals in the several views, a nipple 6 of standard form is provided with the exterior threads 7 which are engaged by the threads of a nut 1 which, in conjunction with a gasket 2, makes the required connection between the nipple 6 and the wheel felloe. The threads 7' on the reduced portion of the standard nipple 6 are not used with my invention but do no harm and are simply left unused.

The nut 1 which is shown is of a construction particularly shown, described and claimed in my United States Letters Patent No. 1,711,837 upon Tire-valve dust caps and is preferably pressed out of sheet metal and is struck up to form a plurality of inwardly-extending hook-like projections 3 which cooperate with an outwardly-extending flange 5 upon a dust-cap 4 resiliently and tightly to hold the dust-cap 4 to the nut 1, in a manner and for a purpose fully described in said United States Letters Patent No. 1,711,837. The improvements of this application are illustrated in connection with a tire-valve dust-cap of the special character noted, but this construction of cap is not necessary to the use of my improved sealing means since the latter may be used in connection with a dust-cap and nipple and other related parts of other construction. There is, however, one advantage to the use of a dust-cap of the special character shown, which will be described hereinafter in detail.

My improved sealing means are intended to prevent leakage around the usual tire-valve contained within the nipple 6 and whose stem is indicated by the ordinal 8. Ordinarily this stem extends outwardly somewhat beyond the mouth of the nipple 6 and my construction of improved sealing means is such as to meet this condition. These sealing means comprise an air-inflatable member adapted to seat upon and communicate with the mouth of the nipple 6 and to be resiliently held to said mouth within the confines of the dust-cap 4 which forms a housing for the nipple 6. Except for the communicating opening between the interior of the air-inflatable member and the mouth of the nipple 6, the air-inflatable member is imperforate.

I have shown two forms of the air-inflatable member, one of which, Figures 5 and 6. is comprised of multiple members secured together in any suitable manner, such as by cementing or vulcanizing, and the other of which, Figure 8, is a single unitary member.

Referring first to the two-part sealing member, Figures 1 and 2, the same comprises a body member 9, preferably of rubber or rubber composition which is resilient and thus can be tightly compressed against the mouth of the nipple 6 so as to cause the latter to press into the materal of the body member 9, but it is not elastic enough to be air-inflatable. I provide this body member 9 with a recess 12 which accommodates the extending end of the valve stem 8 and also with a channel 13 communicating with the chamber 12 and leading exteriorly of the body 9 where it communicates with the interior of an air-inflatable member 10 secured in any desired manner, such as cementing or vulcanizing, to the body member 9 by means of the flange portions 11, or by any other suitable desired means for connecting together the two members, this member 10 being in reality a small balloon section, subject to inflation by air pressure in a manner common to balloons. This sealing member 9—10 is assembled within a resilient metallic shell member 14, Figures 3 and 4, preferably formed of spring brass, and provided with an upper annular flange 17, thus leaving an upper circular opening 18, and with the plurality of vertical slits 15 and alternate inwardly struck shoulders 16. The air-inflatable member 9—10 is inserted within the brass shell 14 from below and the balloon element 10 passed through the hole 18 and the body member 9 pressed by the resilient tongues 16 until it completely passes said tongues when the latter again spring inwardly to form a base or seat for the body member 9, as plainly shown in Figures 5 and 6. These Figures 5 and 6 show the sealing means within the dust cap 4 but they also illustrate how the air-inflatable member appears after it has been assembled with the brass shell 14 and before the two members have been inserted within the dust-cap 4. The insertion of these two assembled members in the dust-cap 4 then follows and the resultant condition is shown in Figure 5. The brass shell 14 tapers somewhat, as is plainly apparent in Figure 5, and is larger than the dust-cap 4, when in expanded condition. It is compressed enough to permit its insertion into the dust-cap through the resiliency provided by the slits 15 and by reason of its taper. After insertion in the dust-cap, the shell 14 fits therein with a tight sliding fit. The two assembled sealing members are pushed into the dust-cap 4 to nearly what would be their proper position therein and then the dust-cap secured by the flange 5 to the projections 3 of the nut 1, if a dust-cap of the character shown in the accompanying drawing is used, or otherwise secured if a different construction of a dust-cap is used. Whatever inward movement of the assembled sealing members is necessary is caused by the upper part of the nipple 6 contacting with the lower part of the body member 9 and pushing the same further within the cap 4, as appears in Figure 6.

When the tire-valve leaks, the air escaping into the chamber 12 will find its way through the channel 13 to the balloon member 10, due to the seal effected by the pressure of the nipple 6 against the body member 9. This member 10 will expand in the space 19 of the dust-cap 4, as plainly shown in Figure 7. The continued air pressure from the leak will increase the pressure within the balloon member 10, causing it to expand until it fills the space 19, and to press the resilient body member 9 down upon the mouth of the nipple 6 so as to cause the latter to press into said body member 9 in the manner plainly shown in Figure 7. Additional pressure, therefore, by reason of any air leak results in sealing the member 9 more tightly to the mouth of the nipple 6 and hence in more tightly sealing the tire-valve against leakage to the outside atmosphere. Effective sealing means are therefore provided which become more efficient in proportion to the increase in the tire-valve leak.

In Figure 8 I have illustrated a form of unitary sealing member comprised of a resilient body part 20 formed with a balloon part 21 and resiliently and tightly contained within the dust-cap 4 without the assistance of a shell member such as shown in Figure 3. In this instance the resilient body member 20 itself provides the tight sliding fit of the sealing means within the dust-cap 4.

If the tire-valve leaks, the small connecting channel 13 prevents the escape of a large amount of air from the tire into the atmosphere when the dust-cap 4 is loosened, because then the air supplied to the balloon 10 by the leak can expand to a greater extent and force the rubber body 9 down upon the nipple 6 to maintain a tight joint. Also, when the dust-cap 4 is thus turned to release its flange 5 from the projections 3, a leak will be evidenced, if one is present, by the lift given to the cap 4 due to the air pressure from the leak. Also, the same condition will be evident when the dust-cap 4 is put into position preparatory to refastening the flange 5 under the hooks 3.

The advantage of using a cap 4 of the construction shown in the accompanying drawing and particularly described and claimed in my said United States Letters Patent No. 1,711,837, is that the operation of said cap for its application and removal requires the turning of the same through only a small angle. Such a slight turning of the cap 4 prevents any biting into or other destruction of the material of which my sealing means 9—10 are comprised. Such destruction of the material from wear and friction might result from turning the dust-cap 4 through a considerable angle during its application and removal.

The material of the balloon element 10 being of good quality and the stress to which the same is subjected being not great enough to unduly strain the balloon material, because of the limited space 19 in which the same can expand, my improved sealing means will wear and be effective as long as the ordinary dust-cap 4 or any one tire-valve is customarily used.

What I claim is:

1. Sealing means for tire-valve nipples comprising a dust-cap member, a rubber body member adapted to seat against the mouth of the nipple within said dust-cap and formed with a chamber communicating with said mouth, an air-inflatable member, said rubber body being formed within an opening communicating with said chamber and with the interior of said air-inflatable member, and a resilient metallic shell member for securing together said rubber body and said air-inflatable member and for holding said rubber body to its seat upon the mouth of the nipple.

2. Sealing means for tire-valve nipples comprising a dust-cap member, a rubber body member adapted to seat against the mouth of the nipple within said dust-cap and formed with a chamber communicating with said mouth, an air-inflatable member, said rubber body being formed with an opening communicating with said chamber and with the interior of said air-inflatable member, a spring brass cap for said rubber body adapted to fit within said dust-cap with a close sliding fit and formed with a flange for securing together said rubber body and said air-inflatable member.

3. Sealing means for tire-valve nipples comprising a dust-cap member, a rubber body member adapted to seat against the mouth of the nipple within said dust-cap and formed with a chamber communicating with said mouth, an air-inflatable member, said rubber body member being formed with an opening communicating with said chamber and with the interior of said air-inflatable member, and means for securing together said rubber body and said air-inflatable member and for holding said rubber body to its seat upon the mouth of the nipple.

4. Sealing means for tire-valve nipples comprising a dust-cap member, a rubber body member adapted to seat against the mouth of the nipple within said dust-cap and formed with a chamber communicating with said mouth, an imperforate air-inflatable member, said rubber body member being formed with an opening communicating with said chamber and with the interior of said air-inflatable member, and means for securing together said rubber body and said air-inflatable member and for holding said rubber body to its seat upon the mouth of the nipple.

Signed by me this 29th day of May, 1928.

JOHN F. ENGLE.